(12) United States Patent
Chang (10) Patent No.: US 9,259,650 B1
(45) Date of Patent: Feb. 16, 2016

(54) GAME METHOD FOR TRAFFIC REALITY ENTERTAINMENT SYSTEM

(71) Applicant: Tang-Hsien Chang, Taipei (TW)

(72) Inventor: Tang-Hsien Chang, Taipei (TW)

( * ) Notice: Subject to any disclaimer, the term of this patent is extended or adjusted under 35 U.S.C. 154(b) by 4 days.

(21) Appl. No.: 14/468,652

(22) Filed: Aug. 26, 2014

(51) Int. Cl.
| | |
|---|---|
| *A63F 13/21* | (2014.01) |
| *A63F 13/217* | (2014.01) |
| *A63F 13/355* | (2014.01) |
| *A63F 13/71* | (2014.01) |

(52) U.S. Cl.
CPC ............. *A63F 13/217* (2014.09); *A63F 13/355* (2014.09); *A63F 13/71* (2014.09)

(58) Field of Classification Search
CPC ...... A63F 13/217; A63F 13/355; A63F 13/71
See application file for complete search history.

(56) References Cited

U.S. PATENT DOCUMENTS

| | | | | |
|---|---|---|---|---|
| 3,924,858 A | * | 12/1975 | Dittrich ................ | A63F 3/0494 273/254 |
| 5,988,642 A | * | 11/1999 | Ziemba ............... | A63F 3/00088 273/251 |
| 8,145,382 B2 | * | 3/2012 | Baur .................. | G09B 19/0038 180/291 |
| 2009/0125161 A1 | * | 5/2009 | Baur .................. | G09B 19/0038 701/1 |
| 2015/0097864 A1 | * | 4/2015 | Alaniz .................... | G06F 3/011 345/633 |
| 2015/0100179 A1 | * | 4/2015 | Alaniz .................... | A63F 13/00 701/1 |

* cited by examiner

*Primary Examiner* — Corbett B Coburn
(74) *Attorney, Agent, or Firm* — Rosenberg, Klein & Lee (57) ABSTRACT

The present invention relates to a game method for traffic reality entertainment system. The game method includes a portable device installing a program, vehicles installing vehicular systems, traffic facilities, and a cloud operating server. The traffic facility or the portable device is connected with the vehicular system. The portable device, the vehicular system, and the traffic facility are connected with the cloud operating server. When the portable device carried by a user is adjacent to the predefined vehicle or the predefined traffic facility, a game is started to perform or the cloud operating server starts to transmit the game data to the program of the portable device. Therefore, various game contents are produced by the traffic reality entertainment system according to the environment where the user stays, so the purpose of integrating the reality with the game and improving the interesting, attractive, and the sense of participation can be achieved.

11 Claims, 5 Drawing Sheets

GAME METHOD FOR TRAFFIC REALITY ENTERTAINMENT SYSTEM

BACKGROUND OF THE INVENTION

1. Field of the Invention

The present invention provides a game method for traffic reality entertainment system, to enable the portable device to receive different game data when the portable device is adjacent to a plurality of vehicles having a vehicular system and a plurality of traffic facilities at different locations, so as to generate different game contents according to the environment where a user (i.e. traveler and/or player) stays.

2. Description of the Related Art

The game market has become a huge industry currently. A traditional game belongs to a console game which allows at least one person to play a game on a single console. However, with the popularization of computers and networks, game companies introduce online games played by the network. The online games allow different users to connect to a server at a time, and more fun is obtained by interacting with others in the game content. Therefore, online games get lots of consumers' attractions quickly, and it has a high market share soon.

The online games is mainly operated by utilizing computers, such as the desktop computer or the notebook, and the user needs to play the online games at a specific space, such as home or Internet Café. So, the user may still feel restricted and inconvenient in playing the online games. However, with the improvement and popularization of technology of mobile phones in our life, smart phone and tablet personal computer (tablet PC) are introduced gradually by companies. The feature of easy carrying is the major advantage for the smart phone and the tablet PC, so now the smart phone and the tablet PC can be seen everywhere.

The game companies starts to introduce related games for smart phone and the tablet PC because the smart phone and the tablet PC are powerful enough to perform the computation of the games. The game's image dpi (dots per inch) and the game content on smart phone and tablet PC are simplified since the computation speed of the smart phone and the tablet PC is inferior to that of the desktop computers or the notebook. However, the feature of passing the odd time for the game fits to the requirement of people who cannot spend much time on the game, so the game on the smart phone and the tablet PC are still popular for lots of users.

Except for the above computers, smart phone, or tablet PC, another game system is using a host connected with a TV to perform the game. The evolutionary process of the host is also transformed from the console game to the online game gradually. Additionally, the game companies introduce sensors, detectors, image capture device, or microphone to detect users' gestures or voices so the users can have a better feeling of game anticipation by doing a corresponding action in playing game.

However, no matter what kind of the game device, the game type, or the game method is used, the user may still need to stay indoors to play the game. The disadvantage of staying indoors for a long time is harmful to the health of the user, and the game still cannot be integrated with the users' living. Further, some problems in real life cannot be solved by using the game. According to disclosure in prior arts, there are lots of problems and drawbacks in the game system. So the inventor and people engaged in this industry aim at improving the problems and drawbacks described above.

SUMMARY OF THE INVENTION

The main objective of the invention is to enable the portable device to be carried by a user into a vehicle or adjacent to a traffic facility. A vehicular system of the vehicle or the traffic facility is connected with the portable device. A cloud operating server starts to transmit game task data to the portable device directly or transmit game task data via the vehicular system or the traffic facility to the portable device and then performs a task on the portable device after the portable device is authenticated. The different game task data is set up according to different vehicular system, or different traffic facility, different time, or different place. Therefore, various game contents can be produced by the traffic reality entertainment system according to the environment in which the user stays actually, so that the purpose of integrating the reality with the game and improving the interesting, attractive, and the sense of participation can be achieved.

Another objective of the invention is to have a traffic improvement by integrating the game with the vehicle. Each vehicle has a unique driving route and each traffic facility has a unique position. A different game task or the different value-points data can be generated in the game when the user takes the different vehicles or the user is close to the different traffic facilities, and the user would like to take different vehicles or choose another line to dodge the traffic jam. Therefore, the situation of traffic jam can be reduced and the user's desires for taking public vehicles can be raised.

Another objective of the invention is to set up a scene communication device in a building. The authentication of the game task is confirmed, and the different game task data or the value-points data is transmitted to the portable device by utilizing the scene communication device. Then the user may be near a specific building, so as to achieve the purpose for participation or advertisement.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Figure 1:
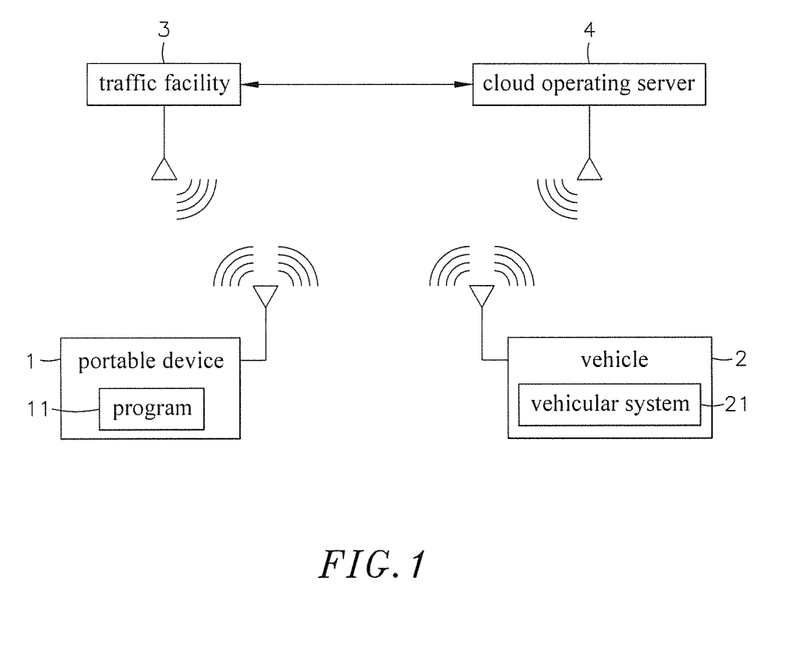
FIG. 1 is a block diagram of a preferred embodiment according to the present invention.
Figure 2:
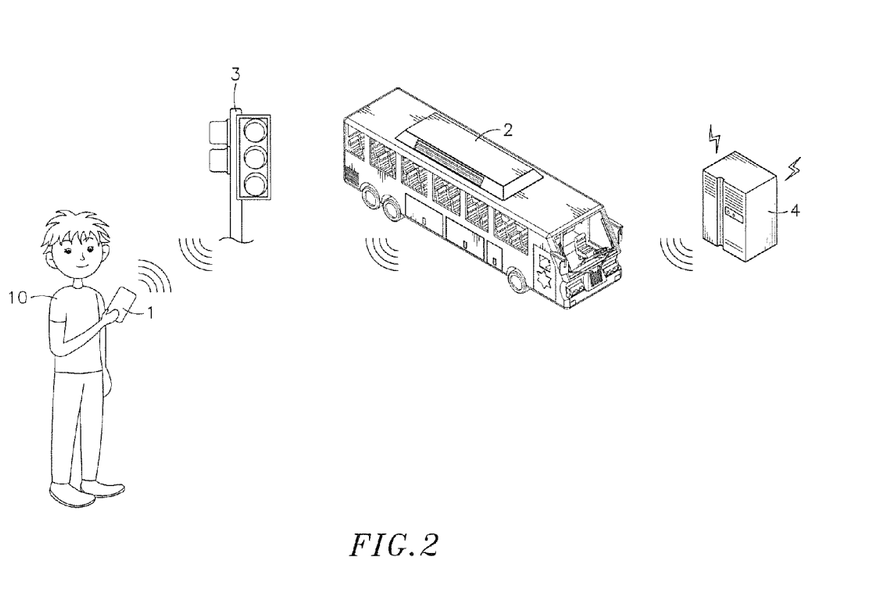
FIG. 2 is a schematic diagram of a preferred embodiment according to the present invention.

Please refer to FIG. 1 and FIG. 2 which are the block diagram and the schematic diagram of the preferred embodiment according to the present invention. The game method for the traffic reality entertainment system comprises at least one portable device 1, a plurality of vehicles 2, a plurality of traffic facilities 3, and at least one cloud operating server 4.

The at least one portable device 1 is hold by a user 10 and can be carried by the user 10 to move. The portable device 1 includes a mobile phone, a smart phone, a tablet PC, or a notebook. A program 11 is installed in the portable device 1. The portable device 1 includes a short range communication modules (such as Bluetooth (including iBeacon), Wi-Fi (including Wi-Fi_direct), Zigbee, radio frequency identification (RFID or NFC), two-dimension barcode (QR-code)), a long range communication modules (such as 3G modules, 4G modules, 5G modules, or others wireless network modules), and a displayer or a touch screen.

A vehicular system 21 is installed on each of the plurality of vehicles 2 correspondingly. The plurality of vehicles 2 include buses, taxis, passenger cars, motorcycles, bikes, MRTs, or trains. The vehicular system 21 is connected with the portable device 1 for the authentication of a game task (such as an authentication for a passenger, an authentication for a task, or a message forwarding) or for transmitting game data to the portable device 1. The vehicular system 21 includes a short range communication modules (such as Bluetooth (including iBeacon), Wi-Fi (including Wi-Fi_direct), Zigbee, radio frequency identification (RFID or NFC), two-dimension barcode (QR-code)), a long range communication modules (such as 3G modules, 4G modules, 5G modules, or others wireless network modules), and a displayer or a touch screen. The vehicular system 21 is connected with the portable device 1, the plurality of traffic facilities 3, or the cloud operating server 4. The plurality of vehicles 2 transmit different game data to the portable device 1 and at least one cloud operating server 4, respectively.

The plurality of traffic facilities 3 are located on a road or roadsides. The traffic facility 3 includes traffic light controller, bus stop, image capturing device (CCTV, CCD), traffic sign (including changeable message sign (CMS or DMS)), vehicle detector (VD), street lamp, MRT equipment or railway station equipment, etc. The traffic facility 3 is equipped with a long range communication modules (such as wire network, wireless network, and/or fiber network), a short range communication modules (such as Bluetooth (iBeacon), Wi-Fi (including Wi-Fi_direct), Zigbee, radio frequency identification (RFID or NFC), and/or two-dimension barcode (QR-code)). The major task of the traffic facility 3 is to authenticate a game task with the portable device 1, such as the location data authentication, the task authentication, or the message forwarding, or to transmit the different game data to the portable device 1. The traffic facility 3 also authenticates the locations or the game task, such as an inter-authentication with each other, the task authentication, or the message forwarding, or transmits the game data, and so on. The plurality of traffic facilities 3 transmit the different game data to the cloud operating server 4 respectively.

The at least one cloud operating server 4 is connected with the portable device 1, the vehicular system 21, and the traffic facility 3 by the wired network or the wireless network. The cloud operating server 4 includes a communication server, an operation server, a database system, a template database for computing, the message broadcasting or a website, and an operating system. The cloud operating server 4 connects, transmits, and controls the game task data on the vehicular system 21 and the traffic facility 3, and provides the game task data to the program 11 in the portable device 1 for performing the task. It also receives and stores the authentication and the completed game task returned from the portable device 1 by the network. After receiving the completed task data, the cloud operating server 4 compares the task data, the data of the vehicle 2 or the traffic facility 3, and a game designed database of the cloud operating server 4, to calculate value-points data and stores the result of the value-points data for reference and transmits the result of the value-points data to the portable device 1 by the network.

The above network transmission between the portable device 1 and the cloud operating server 4 includes the way of directly transmitting the game task data from the cloud operating server 4 to the portable device 1, or other way that the cloud operating server 4 first transmits the game task data to the traffic facility 3 or the vehicular system 21 of the vehicle 2 for being stored, and then the vehicular system 21 or the traffic facility 3 transmits the game task data to the portable device 1. After the completed task data is transmitted from the portable device 1 to the traffic facility 3 or the vehicular system 21 of the vehicle 2, the traffic facility 3 or the vehicular system 21 of the vehicle 2 processes the data and then transmits the processed result to the cloud operating server 4.

The above "authentication" indicates a confirmation of receiving a predefined electronic code or a tag as a position or a task. For example: after the portable device 1 is used to capture the two-dimension code (QR-code) or to receive the electronic code of the Bluetooth signals (iBeacon) when the portable device 1 is carried to a predefined location or a predefined vehicle 2, the portable device 1 transmits the two-dimension code or the electronic code to the cloud operating server 4 for performing a comparison to obtain a confirmation. And, the authentication indicates the whole processing of obtaining the confirmation. The authentication data includes user data, value-points, data stored in the program 11 of the portable device 1, or an operator of the vehicle 2, a route code of the vehicle, a name, a position or a code of the traffic facility 3.

Figure 3:
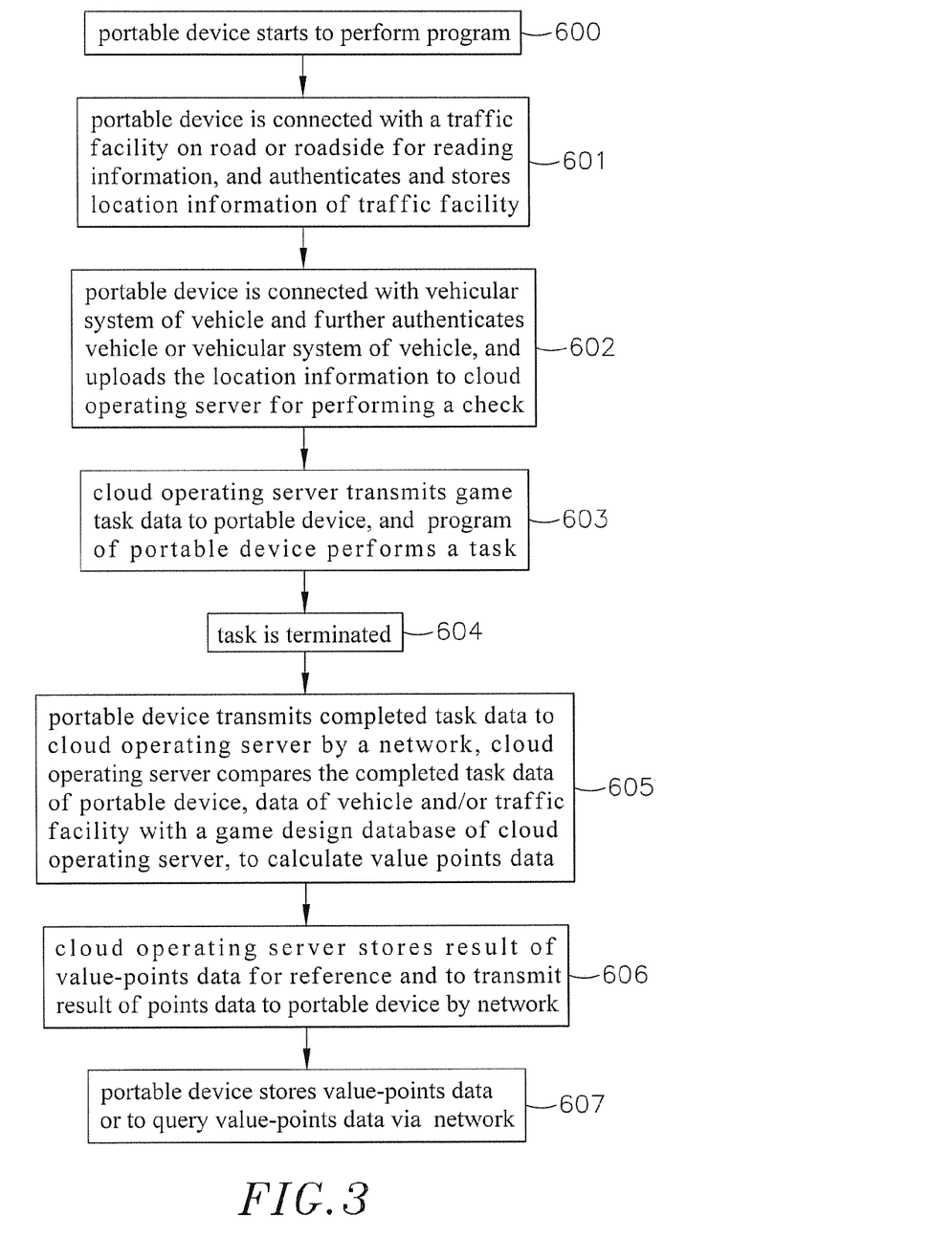
FIG. 3 is a first flow chart of a game method according to the present invention.

Please refer to FIG. 1, FIG. 2, and FIG. 3 which are the block diagram, the schematic diagram, and first flow chart of the preferred embodiment according to the present invention. As shown in FIG. 3, the above game method for traffic reality entertainment system comprises the following steps.

Step (600): starting to performing the program 11 in the portable device 1.

Step (601): using the portable device 1 to connect with the traffic facility 3 located on a road or a roadside for reading information, and using the portable device 1 to authenticate and store location information of the traffic facility 3.

Step (602): using the portable device 1 to connect with the vehicular system 21 of the vehicle 2 and further authenticate the vehicle 2 or the vehicular system 21 (to authenticate the user's task) of the vehicle, and uploading the location information to the cloud operating server 4 for performing a check.

Step (603): transmitting game task data from the cloud operating server 4 to the portable device 1, and performing the task by the program 11 of the portable device 1.

Step (604): terminating the task.

Step (605): using the portable device 1 to transmit completed task data to the cloud operating server 4 by the network, using the cloud operating server 4 to compare the completed task data of the portable device 1, the data of the vehicle 2 and/or the traffic facility 3 with a game design database of the cloud operating server 4, to calculate value-points data.

Step (606): using the cloud operating server 4 to store the value-points data for reference and to transmit the value-points data to the portable device 1 by the network.

Step (607): using the portable device 1 to store the value-points data or to query the value-points data via the network, and then terminating the steps.

An embodiment of using a bus to be the vehicle 2 is illustrated as below. When the user 10 carries the portable device 1 (smart phone) and prepares to take the vehicle 2 to move, the user 10 first moves to the traffic facility 3 (bus stop), and then a connection between the bus stop and the smart phone is established. The connection manner may include a barcode scan (such as one-dimension barcode, QR-code, and so on) or the wireless connection (such as the Bluetooth (including iBeacon), Wi-Fi (including Wi-Fi_direct), Zigbee, radio frequency identification (RFID or NFC), and so on). Thus, the smart phone (portable device 1) of the user 10 obtains the location data authentication. When the user 10 takes an assigned bus (vehicle 2), the smart phone performs an authentication by scanning a barcode in the bus (such as the one-dimension barcode, the QR-Code, and so on) or connecting with the vehicular system by the wireless network, wherein the wireless network may be the Bluetooth (including iBeacon), Wi-Fi (including Wi-Fi_direct), Zigbee, radio frequency identification (RFID or NFC), and so on. The cloud operating server 4 may transmit a game task to the smart phone in accordance with the time and the place. Based on the user's desires, the value-points, a game level, an attack power, or an action, the user 10 can choose a task to be performed by the program 11 (such as the accumulated miles, a personal fight, or a siege fight) until the task is terminated (the user 10 terminates the game or leaves the bus). During the period of playing the game, the portable device 1 transmits the task data completed by the user 10 to cloud operating server 4 by the network, and the cloud operating server bases the game designed environment to determine a result or to increase/decrease the value-points data. Then, the cloud operating server 4 stores the value-points data for reference and transmits the value-points data to the smart phone by the network.

The above game design can set the cloud operating server 4 to be a controller of collecting a real-time traffic situation or having a statistics for the traffic situation. The traffic facility 3 on a smooth road has a high ratio value or high value-points data. The traffic facility 3 on a congested road has a low ratio value or low value-points data. Or, according to the different type, route, or company of the vehicle 2, the different ratio value or the different value-points data will be provided. When the comparison of the task data, the data stored in the vehicle 2, and the data stored in the cloud operating server 4 is performed, the user 10 will get the different value-points data in the game or on her/his trip. Then, the user 10 would like to take different vehicle 2. Since the traffic facility 3 is fixed and located at the roadside, the portable device 1 may get the different value-points data from the traffic facility 3 at the different location, or the different vehicular system 21 or the traffic facility 3 may provide the different game task data to the portable device 1, to make the user 10 drive or pass a road with convenient traffic. Thus, the situation of traffic jam could be reduced and the user's desires for taking public vehicles can be raised, and the objective of combining the game to improve the traffic situation is achieved.

The above task may include a predefined period, what kind of the vehicle 2 being taken, which the regions being crossed, which landmark being passed, and which store or a bus stop being arrived. The different contents of the task data are set up in a database of the cloud operating server 4, and incentive value-points are given according to the task correspondingly. The task may be an occupation of a road or a region. All the users 10 are separated into different groups. The judgment is based on the percentage of the different groups in different roads or in different regions in the predefined period. The group with the highest percentage can occupy the road or the region. In addition, a computer enemy is randomly given to the player according to the location information of the portable device 1. The action energy is reduced if the player loses. The player can obtain an experience value or the incentive value-points according to enemy's level if the player wins. The above task model could be a medieval siege, a person fight, a group fight, or the miles accumulations, and the task type could be a chess type, an action type, a role playing type, or a shooting type.

Figure 4:
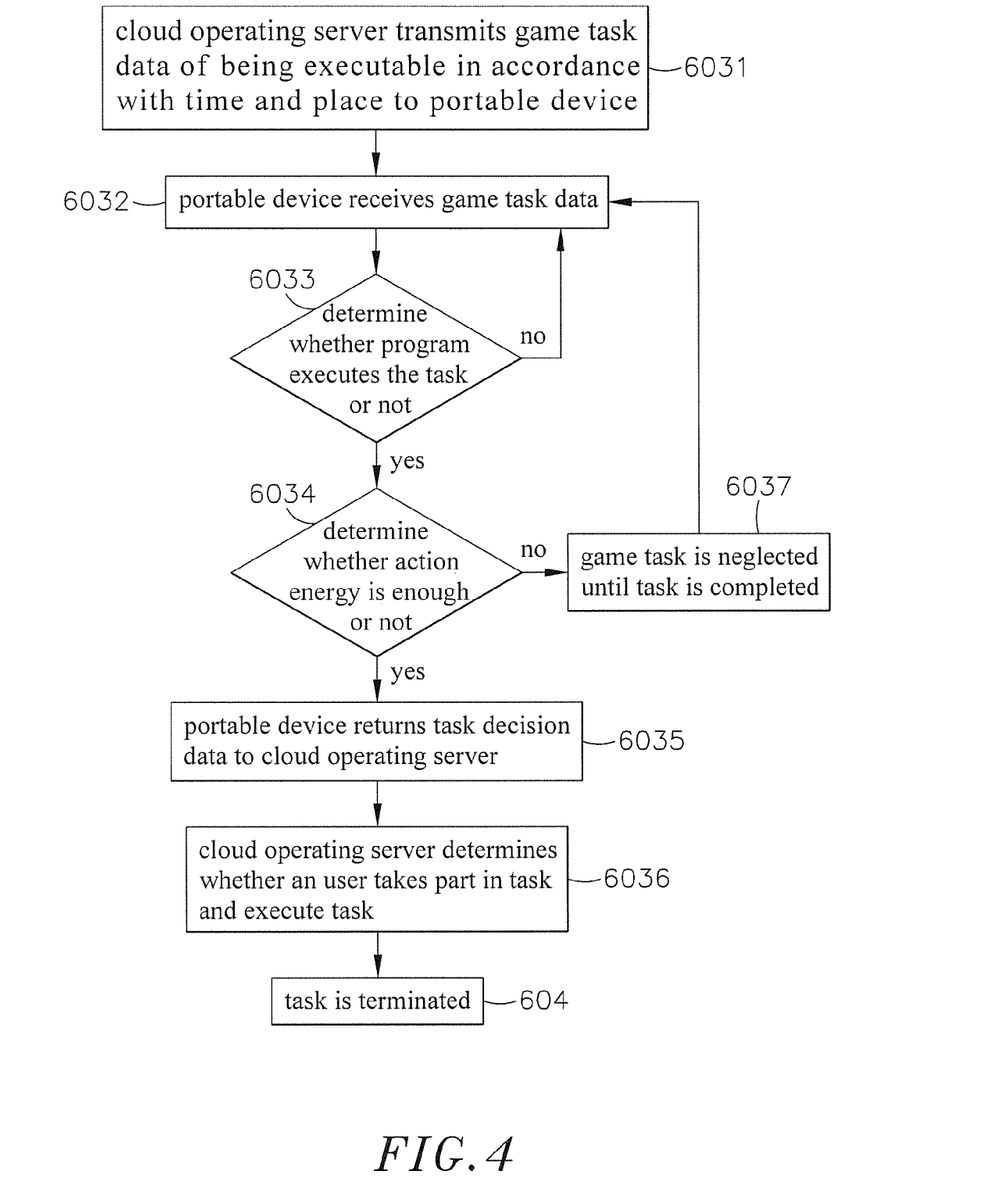
FIG. 4 is a second flow chart of a game method according to the present invention.

Please refer to FIG. 1, FIG. 2, FIG. 3, and FIG. 4 which are the block diagram, the schematic diagram, the first flow chart, and the second flow chart of the preferred embodiment according to the present invention. As shown in FIG. 3 and FIG. 4, the step (603): transmitting game task data to the portable device 1 by the cloud operating server 4, further comprises the following steps.

Step (6031): using the cloud operating server 4 to transmit the executable game task data (including the value-points data and action energy of the user 10) in accordance with the time and the place to the portable device 1.

Step (6032): receiving the game task data by the portable device 1.

Step (6033): determining whether the program 11 executes the task or not, performing step (6034) if yes, or performing step (6032) if no.

Step (6034): determining whether the action energy (the confirmation is confirmed by the user 10) is enough or not, performing step (6035) if yes, or performing step (6037) if no.

Step (6035): returning task decision data to the cloud operating server 4 by the portable device 1.

Step (6036): using the cloud operating server 4 to determine whether the user 10 takes part in the task and execute the task, and then performing the step (604).

Step (6037): neglecting game task until the task is completed and then performing step (6032).

The above game task data is transmitted from the cloud operating server 4 to the portable device 1 directly or from the cloud operating server 4 to the traffic facility 3 or the vehicle 2, and then to the portable device 1, and vice versa. The cloud operating server 4 in accordance with the time and the place transmits the game task data to the traffic facility 3 or the vehicular system 21 of the vehicle 2 for being stored, and the traffic facility 3 or the vehicular system 21 of the vehicle 2 also processes the data and transmits the processed result to the cloud operating server 4 after processing the game task data. All such various modifications and equivalent structural arrangements are intended to be included within the scope of the invention.

Figure 5:
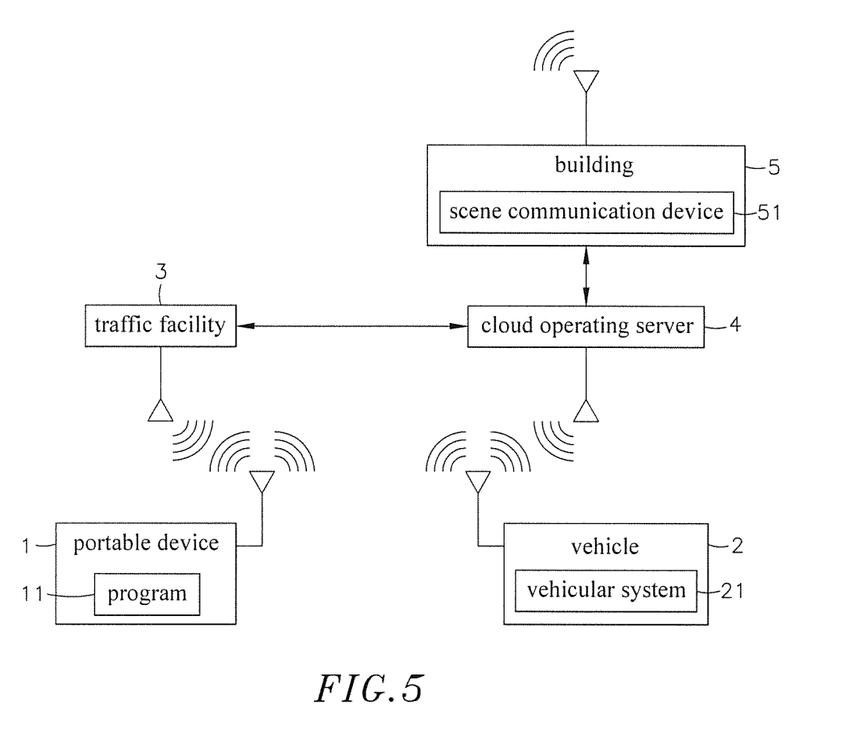
FIG. 5 is a block diagram of another embodiment according to the present invention.

Please reference with FIG. 5 which is a block diagram of another embodiment according to the present invention. As shown in FIG. 5, the traffic reality entertainment system may further set up a scene communication device 51 in a building 5. The building 5 may be a store, a shop, a restaurant, a museum, a hotel, or a tourist spot. The scene communication device 51 includes a long range communication modules (such as 3G module, 4G module, 5G module, or others wireless network modules) and a short range communication modules (such as Bluetooth (iBeacon), Wi-Fi (including Wi-Fi_direct), Zigbee, radio frequency identification (RFID or NFC), two-dimension barcode (QR-code)). The scene communication device 51 uses the long range communication modules to connect with the cloud operating server 4. When the portable device 1 carried by the user 10 is near the building 5 and the portable devices 1 is authenticated by the game task, the scene communication device 51 transmits the authentication of the game task to the portable device 1, and performs the subsequent processing and transmits data to the cloud operating server 4. Then, the user 10 may approach a predefined building 5 due to the incentives of the game or the value-points data, so as to achieve the purpose for participation and advertisement.

The above transmission between the portable device 1 and the scene communication device 51 is performed after the portable device 1 is used to store or query the value-points data by the network. The portable device 1 is connected with a scene communication device 51 of the building 5 for reading information, and the location information of the building 5 or the scene communication device 51 is authenticated and stored by the portable device 1. The building 5 or the scene communication device 51 is authenticated by the portable device 1, and the data is uploaded to the cloud operating server 4 for a check. The scene communication device 51 transmits the game task data to the portable device 1. The program 11 of the portable device 1 executes the task and terminates the task, and the portable device 1 transmits the completed task data to the cloud operating server 4 via the network. The cloud operating server 4 compares the completed task data of the portable device 1, the data of the building 5 and the scene communication device 51 with the game design database of the cloud operating server 4, so as to calculate the value-points data, The cloud operating server 4 stores the result of value-points data for reference and transmits the result of the value-points data to the portable device 1, and then the portable device 1 stores the value-points data or queries the value-points data by the network, and the step is terminated.

Some advantages are available when the present invention of the game method for the reality entertainment system is applied.

First, the portable device 1 is carried by the user 10 to move, and it can be carried into the vehicle 2 or adjacent to the traffic facility 3. The vehicular system 21 of the vehicle 2 or the traffic facility 3 is connected with the portable device 1, and the portable device 1 can receive the game task data and then execute the task. The different game task data is provided by the different vehicular systems 21 or the traffic facilities 3, so various game contents are produced by the traffic reality entertainment system according to the environment where the user stays actually, and the purpose of integrating the reality with the game and raising the interesting, attractive, and the sense of participation are achieved.

Secondly, because each of the vehicle 2 has different routes and each of the traffic facility 3 is on different positions, the different game task data or different value-points data is provided when the user 10 takes different vehicles 2 or the user 10 is close to the traffic facility 3 at different positions. The traffic facility 3 on a smooth road or the vehicle 2 is given a high ratio value or the high value-points data. Otherwise, a low ratio value or the low value-points data is given. The user 10 would like to take the different vehicle 2 or choose another route to go around the traffic jam. Therefore, the situation of traffic jam can be reduced and the user's desires for taking public vehicle can be raised.

Thirdly, the traffic reality entertainment system further sets up the scene communication device 51 in the building 5. The scene communication device 51 transmits the game task data to the portable device 1. Since the scene communication device 51 transmits the different game task data or the different value-points data to the portable device 1, the user 10 may be closed to the predefined building 5 due to the inducement of the game or the value-points data.

The present disclosure is related to a game method for traffic reality entertainment system, comprising the portable device 1, the traffic facility 3, the vehicle 2, and the cloud operating server 4. When the portable device 1 carried by the user 10 is moved to the vehicle 2 or adjacent to the traffic facility 3, the portable device 1 is connected with the traffic facility 3 or the vehicular system 21 of the vehicle 2, and it performs the authentication and receives the task data. The portable device 1 produces various game contents according to the environment in which the user 10 stays, so as to achieve the major objective of integrating the traffic reality with the game.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A game method for traffic reality entertainment system, comprising:
   (600) starting to perform a program of a portable device;
   (601) using said portable device to connect with a traffic facility on road or roadside, sidewalk for reading information, and using said portable device to authenticate and store location information of said traffic facility;
   (602) using said portable device to connect with a vehicular system of a vehicle and further authenticate said vehicle or said vehicular system of said vehicle, and uploading said location information to a cloud operating server for performing a check;
   (603) transmitting game task data from said cloud operating server to said portable device, and performing a task by said program of said portable device;
   (604) terminating said task;
   (605) using said portable device to transmit completed task data to said cloud operating server by a network, using said cloud operating server to compare said completed task data of said portable device, said data of said vehicle and/or said traffic facility with a game design database of said cloud operating server, to calculate value-points data;
   (606) using said cloud operating server to store result of said value-points data for reference and to transmit result of said value-points data to said portable device by said network; and
   (607) using said portable device to store said value-points data or to query said value-points data via said network, and then terminating steps.

2. The game method as claimed in claim 1, wherein said step (603) further comprises the following steps in sequential order:

(6031) using said cloud operating server to transmit said game task data of being executable in accordance with time and place to said portable device;

(6032) receiving said game task data by said portable device;

(6033) determining whether said program executes said task or not, performing step (6034) if yes, or performing step (6032) if no;

(6034) determining whether action energy is enough or not, performing step (6035) if yes, or performing step (6037) if no;

(6035) returning task decision data to said cloud operating server by said portable device;

(6036) using said cloud operating server to determine whether an user takes part in said task and execute said task, and then performing the step (604); and (6037) neglecting game task until said task is completed and then performing step (6032).

3. The game method as claimed in claim 1, wherein said authentication data is user data, value-points, and data stored in said program of said portable device.

4. The game method as claimed in claim 1, wherein said authentication data is a manufacturer of said vehicle.

5. The game method as claimed in claim 1, wherein said authentication data is a line code of said vehicle.

6. The game method as claimed in claim 1, wherein said authentication data is a name of said traffic facility, a position of said traffic facility and a code of said traffic facility.

7. The game method as claimed in claim 1, wherein a network transmission between said portable device and said cloud operating server comprises a way of directly transmitting said game task data from said cloud operating server to said portable device.

8. The game method as claimed in claim 1, wherein a network transmission between said portable device and said cloud operating server comprises another way that said cloud operating server first transmits said game task data to said traffic facility for being stored, and said vehicle facility then transmits said game task data to said portable device, and after transmitting said completed task data from said portable device to said traffic facility, said traffic facility performs a process and then transmits a processed result to said cloud operating server.

9. The game method as claimed in claim 1, wherein a network transmission between said portable device and said cloud operating server comprises the other way that said cloud operating server first transmits said game task data to said vehicular system of said vehicle for being stored, and said vehicular system then transmits said game task data to said portable device, and after transmitting said completed task data from said portable device to said vehicular system of said vehicle, said vehicular system of said vehicle performs a process and then transmits a processed result to said cloud operating server.

10. The game method as claimed in claim 2, wherein said game task data in said step (6031) comprises value-points and action energy of user.

11. The game method as claimed in claim 1, wherein after said portable device stores said value-points data or query said value-points data by said network, said portable device is connected with a scene communication device of a building for reading information, said location information of said building or said scene communication device is authenticated and stored by said portable device, said portable device then uploads data to said cloud operating server for said check by authenticating said building or said scene communication device, said scene communication device transmits said game task data to said portable device, said program of said portable device executes said task and terminates said task, said portable device transmits said completed task data to said cloud operating server via said network, and said cloud operating server compares said completed task data of said portable device, said data of said building and said scene communication device with said game design database of said cloud operating server, so as to calculate value-points data, said cloud operating server stores result of said value-points data for reference and transmits result of said value-points data to said portable device, and then said portable device stores said value-points data or queries said value-points data by said network, and the step is terminated.

* * * * *